US012711425B2

(12) United States Patent
Sharpe et al.

(10) Patent No.: US 12,711,425 B2
(45) Date of Patent: Aug. 18, 2026

(54) MACHINE LEARNING EMBEDDINGS FOR EVOLVING CATEGORY SETS

(71) Applicant: Capital One Services, LLC, McLean, VA (US)

(72) Inventors: Samuel Sharpe, Cambridge, MA (US); Christopher Bayan Bruss, Washington, DC (US); Senthil Kumar, Marlboro, NJ (US); Nikita Seleznev, McLean, VA (US); Fangxiang Jiao, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 600 days.

(21) Appl. No.: 18/336,823

(22) Filed: Jun. 16, 2023

(65) Prior Publication Data

US 2024/0420018 A1 Dec. 19, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 11,544,555 B1 * 1/2023 Lador .................... G06N 20/00
12,047,391 B2 * 7/2024 Sood ..................... H04L 67/133
12,073,299 B2 * 8/2024 Neelakantan .......... G06N 20/00
2017/0270429 A1 * 9/2017 Bhattacharya ......... G06N 20/10
2018/0293241 A1 * 10/2018 Chittar ..................... G06N 5/01
2019/0019105 A1 * 1/2019 Schatz ..................... G06N 3/08
2019/0164082 A1 * 5/2019 Wu ........................ G06N 20/00
2020/0201908 A1 * 6/2020 Ma ...................... G06F 16/9014
2021/0004693 A1 * 1/2021 Joglekar ................ G06N 3/084
2021/0049664 A1 * 2/2021 Lundgaard ........ G06F 16/90344
2021/0141995 A1 * 5/2021 Lundgaard ............. G06V 10/40
2021/0342711 A1 * 11/2021 Mokeev .............. G06F 16/3347
2022/0197961 A1 * 6/2022 Baek ....................... G06F 40/30
2022/0245322 A1 * 8/2022 Lundin .................... G06N 3/09
2022/0398377 A1 * 12/2022 Lahlou ................... G06N 3/045
2023/0065915 A1 * 3/2023 Berestovsky ........... G06F 18/22
2023/0146053 A1 * 5/2023 Li ....................... G06F 16/9035
2024/0403700 A1 * 12/2024 Sharpe ................... G06N 20/00

FOREIGN PATENT DOCUMENTS

CN 120671011 A * 9/2025 ............. G06N 23/08
WO WO-2022232673 A1 * 11/2022 ............. G06F 40/30

* cited by examiner

*Primary Examiner* — Hasanul Mobin
(74) *Attorney, Agent, or Firm* — Foley & Lardner LLP

(57) ABSTRACT

In some embodiments, a computing system may generate a prediction related to a new category (not included in a set of categories) using a machine learning model trained on a set of embeddings corresponding to the category set. As an example, the computing system may generate a set of hashes such that each hash of the hash set is mapped to an embedding of the embedding set. When a new category added to the category set, the computing system may generate a given hash for the new category and identify a first hash of the hash set that matches the given hash. Based on identifying the first hash as a matching hash, the computing system may use an existing embedding (e.g., mapped to the first hash) with the machine learning model in connection with the new category, thereby avoiding a need to add a new embedding to the embedding set.

20 Claims, 4 Drawing Sheets

Hashing Characteristics
200

Category Name
205

Category Description
210

Category Code
215

MACHINE LEARNING EMBEDDINGS FOR EVOLVING CATEGORY SETS

SUMMARY

An embedding may include a mapping of a discrete or categorical variable to a vector of continuous numbers. Embeddings may make it easier to do machine learning on large inputs such as sparse vectors that represent words. An embedding may capture the semantics of the categorical variable it encodes by placing semantically similar categorical variables close together in an embedding space. A neural network may use embeddings to reduce the dimensionality of categorical variables and meaningfully represent categories in the embedding space. Embeddings may be used to find the nearest neighbors in an embedding space, for example, to make recommendations based on user interests. Additionally, embeddings may be used as input to a machine learning model for a supervised task.

A computing system may start with an initial set of vocabulary and may generate embeddings for the initial set. The embeddings may be used by other machine learning models to perform various tasks. However, as time goes on, additional vocabulary words may be added. For example, a new content item may become available for recommendation to a user and as a result, the new content item may be added to the set of vocabulary. In existing systems, introducing new vocabulary is computationally expensive because a machine learning model that generates the embeddings may need to be retrained to generate an embedding for the new vocabulary. Further, downstream machine learning models that use the embeddings may need to be retrained to account for the newly generated embeddings. Thus, it may be prohibitively costly in terms of computation resources and time to enable the use of new vocabulary in existing systems due to the need for model retraining.

To address these and other issues, systems and methods described herein may generate hashes (e.g., by using locality sensitive hashing or other techniques to generate the hashes) for a set of vocabulary. As an example, each word in the set of vocabulary may be associated with an embedding. When a new vocabulary word is added to the set, the system may generate a hash for the new vocabulary word and use the hash to determine which of the existing vocabulary words is most similar to the new vocabulary word. The computing system may use an already-existing embedding of the similar vocabulary word, for example, instead of generating a new embedding for the new vocabulary word. By doing so, the system may avoid the need to retrain an embedding model or other downstream models that use embeddings every time new vocabulary is added. By doing so, the computing system may reduce the amount of resources dedicated to training or updating machine learning models that generate the embeddings or that use the embeddings for classifications, predictions, or other tasks.

In some aspects, a computing system may determine a set of categories, where each category in the set of categories comprises a name and a textual description. The computing system may generate a set of embeddings, where each embedding in the set of embeddings corresponds to a category of the set of categories. The computing system may generate, based on data associated with the set of categories, a set of hashes, where each hash of the set of hashes corresponds to a category in the set of categories. The computing system may determine a first hash based on data associated with a first category not included in the set of categories. Based on a comparison of the first hash with the set of hashes, the computing system may determine a first embedding of the set of embeddings and may assign the first embedding to the first category. The computing system may generate, via a machine learning model, based on the first embedding, output associated with the first category.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (e.g., the entire portion), a given item (e.g., data) unless the context clearly dictates otherwise.

BRIEF DESCRIPTION OF THE DRAWINGS

FIG. 2 shows example characteristics or data that may be used in generating a hash, in accordance with one or more embodiments.

DETAILED DESCRIPTION OF THE DRAWINGS

In the following description, for the purposes of explanation, numerous specific details are set forth in order to provide a thorough understanding of the embodiments of the disclosure. It will be appreciated, however, by those having skill in the art that the embodiments of the disclosure may be practiced without these specific details or with an equivalent arrangement. In other cases, well-known structures and devices are shown in block diagram form in order to avoid unnecessarily obscuring the embodiments of the disclosure.

Figure 1:
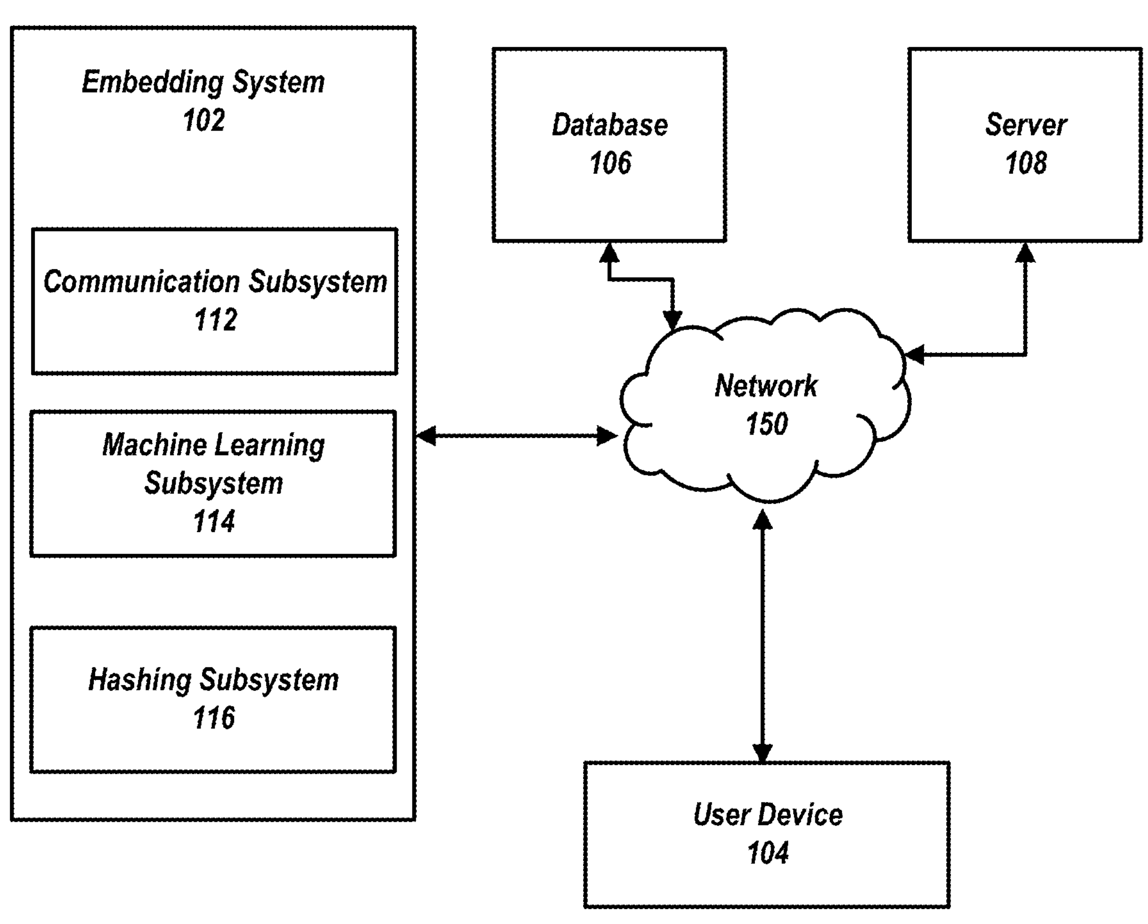
FIG. 1 shows an example diagram for a system that may use hashing techniques to determine an embedding to use for a category, in accordance with one or more embodiments.

FIG. 1 shows an illustrative system 100 that may generate a set of hashes (e.g., via locality sensitive hashing or other techniques to generate the hashes) for a set of vocabulary words or categories. As an example, each word in the vocabulary may be associated with an embedding. When a new vocabulary word is added to data used by system 100, system 100 may generate a hash for the new vocabulary word and use the hash to determine which of the existing vocabulary words is most similar to the new vocabulary word. System 100 may use the embedding of the similar vocabulary word, for example, instead of generating a new embedding for the new vocabulary word, thereby allowing an embedding training set to remain unchanged (or static) (e.g., when changes or additions to the corresponding vocabulary set used by system 100 are not substantial, when use of a pre-existing embedding in the embedding set for new vocabulary words would not significantly decrease overall accuracy of the corresponding model, etc.). By doing so, system 100 may avoid the need to retrain an embedding model or other downstream models that use embeddings every time new vocabulary is added, thereby reducing computational resources usage for system 100.

The system 100 may include an embedding system 102, a user device 104, a database 106, and a server 108, which may communicate with each other via a network 150. The embedding system 102 may include a communication subsystem 112, a machine learning subsystem 114, a hashing subsystem 116, or a variety of other components. In some embodiments, the system 100 may include additional devices or components such as one or more servers, firewalls, databases, or a variety of other computing devices or components.

The embedding system 102 may determine a set of categories. A category may include a word (e.g., a vocabulary word), phrase, sentence, or other collection of characters. A category may include a product. For example, a category may include a banking product, such as a loan, account, credit card, virtual card, or a variety of other banking products. A category may include a merchant. For example, a set of categories may include merchants for whom a bank processes transactions. The embedding system 102 may obtain a plurality of categories from a separate computing system (e.g., from server 108) and may determine a portion of the plurality of categories to use as the set of categories. Each category in the set of categories may include a name and a textual description. A textual description may include text (e.g., a phrase, sentence, paragraph, etc.) indicating what the category is or what the category does. In some embodiments, a category may include a transaction count. For example, if the category is a merchant, the transaction count may indicate how many transactions the merchant has performed or an average number of transactions the merchant performs for a given time period (e.g., per month, quarter, year, etc.). In some embodiments, a category may include a category code. For example, if the category is a merchant, the category code or merchant code may indicate a type of business that the merchant is engaged in.

The embedding system 102 may generate a set of hashes that correspond to the set of categories. Each hash in the set of hashes may correspond to a category of the set of categories, and each hash in the set of hashes may correspond to an embedding (e.g., as described in more detail below). The embedding system 102 may generate each hash in the set of hashes such that two similar categories have similar hashes. For example, two categories may be similar if their hashes do not satisfy a threshold distance. In one use case, the hashes do not satisfy the threshold distance if a distance between the hashes is less than the threshold distance apart (e.g., as measured by a distance metric such as cosine distance, Euclidean distance, etc.). In another use case, hashes may enable the embedding system 102 to determine an existing category (of the set of categories) to which a new category is most similar (e.g., as compared to other existing categories of the set of categories). For example, if a new category is obtained, the embedding system 102 may generate a new hash for the new category and compare the new hash with the previously-generated hashes. The embedding system 102 may determine to use an embedding corresponding to the category that has a hash that is most similar to the new hash. Additionally, or alternatively, the embedding system 102 may determine to use a given embedding corresponding to a given category that has a hash that satisfies a similarity threshold with the new hash (e.g., the hash of the given category is less than a threshold distance from the new hash). For example, instead of generating a new embedding for the new category, the embedding system 102 may assign the embedding of the category to represent the new category based on a determination that the category corresponds to a given hash (of the set of hashes) that is most similar to the new hash of the new category or the hash satisfies the similarity threshold with the new hash of the new category.

Figure 2:
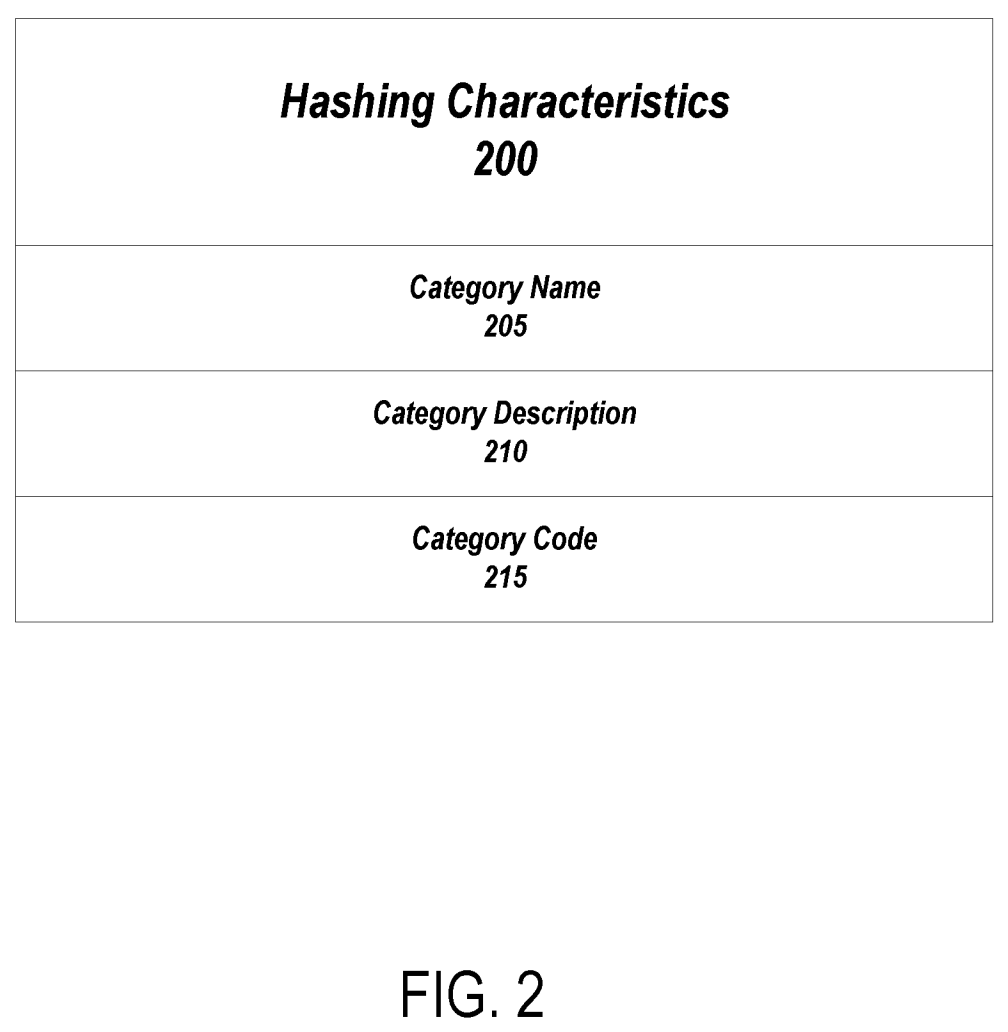

In some embodiments, the embedding system 102 may generate a plurality of vectors based on data associated with the categories. The vectors may be used to generate the set of hashes. To generate a hash for a given category, the embedding system 102 may generate a one-hot vector for each piece of data or characteristic associated with the category. For example, referring to FIG. 2, example hashing characteristics 200 are shown. One vector may be generated for a category name 205. An additional vector may be generated for the category description 210, and another vector may be generated for a category code 215 associated with the category. Each of these vectors corresponding to the category name 205, category description 210, and category code 215 may be concatenated and input into a hashing function (e.g., locality sensitive hashing or other techniques) to generate the hash for the category.

In one example, the embedding system 102 may generate a first portion of a vector, where the first portion is associated with a tokenized name of the category. The embedding system 102 may generate a second portion of the vector, where the second portion is associated with a tokenized description of the category. The embedding system 102 may generate a concatenation by concatenating the first portion and the second portion. Based on the concatenation, the embedding system 102 may generate a first hash of the set of hashes. In one use case, an input comprising the concatenation of the first and second portions) may be input to a hashing function (e.g., locality sensitive hashing or other techniques) to generate the first hash for the set of hashes.

It should be noted that, while one or more operations are described herein as being performed via one or more locality sensitive hashing techniques, these operations may, in some embodiments, be performed via one or more other techniques. As an example, the use of locality sensitive hashing techniques preserves the similarity between points in a high-dimensional space when mapping them to a lower-dimensional space such that similar points have a higher probability of colliding (i.e., being assigned the same hash value) than dissimilar points. Locality sensitive hashing techniques functions are typically probabilistic, meaning they use randomness to achieve this goal. As another example, one or more non-hashing techniques may be used in lieu of or in addition to hashing techniques. In one use case, a non-hashing technique that employ randomness (e.g., via a pseudorandom algorithm or other randomization technique) may be used to perform one or more operations described herein as being performed via one or more hashing techniques. For example, while random projection (e.g., a dimensionality reduction technique based on projecting high-dimensional data onto a lower-dimensional space using random hyperplanes) is not explicitly a hashing method, random projection can be used to create binary hash codes for points in a manner similar to one or more locality sensitive hashing techniques, by encoding the side of the hyperplane they lie on.

In some embodiments, the embedding system 102 may generate hashes such that the set of hashes is smaller than the set of categories. The embedding system 102 may determine that embeddings should be generated for only a percentage (e.g., a threshold percentage) of the set of categories. For example, the embedding system 102 may determine that only 80% of the categories should have embeddings. The embedding system 102 may generate hashes such that some of the categories are mapped into the same hash bucket (e.g., 20% of the categories are mapped into the same hash bucket as other categories). By doing so, the embedding system 102 may enable other machine learning models to train and generate classifications or predictions more efficiently because there are fewer embeddings or categories to use. In one example, the embedding system 102 may determine a threshold percentage of the set of categories and generate the set of hashes such that a size of the set of embeddings satisfies the threshold percentage (e.g., the number of embeddings in the embedding set is less than the threshold percentage, the number of embeddings is equal to the threshold percentage, etc.).

The embedding system 102 may generate a set of embeddings. Each embedding in the set of embeddings may correspond to a category in the set of categories. Each embedding in the set of embeddings may correspond to a hash in the set of hashes. One or more embeddings in the set of embeddings may be used by a machine learning model (e.g., a model described in connection with FIG. 1 or FIG. 3) to generate one or more predictions or other outputs. As an example, the set of embeddings may be used by a machine learning model to generate recommendations associated with the set of categories.

The embedding system 102 may obtain a first category not included in the set of categories. The first category may be a new category that was not included in the set of categories. In one example, the embedding system 102 may obtain an indication that a new product is available and should be included in recommendations to users. To generate recommendations for the new product, the embedding system 102 may need an embedding for the new product and may use an existing embedding instead of generating a new embedding, for example, as described in more detail below.

The embedding system 102 may determine or generate a first hash for the first category. The embedding system 102 may use data associated with the first category to determine the first hash. The embedding system 102 may generate the first hash using the same technique that was used to generate each hash in the set of hashes.

In some embodiments, the first hash may be generated such that it corresponds to a hash bucket associated with the set of hashes. For example, the embedding system 102 may generate a vector representation of the data associated with the first category and generate the first hash based on the vector representation such that the first hash corresponds to a bucket associated with a hash of the set of hashes. The vector representation may include a first portion corresponding to the name of the first category and a second portion corresponding to a code associated with the first category.

The embedding system 102 may assign a first embedding set of embeddings to the first category. The embedding system 102 may determine which embedding of the set of embeddings to assign to the category, for example, based on comparing the first hash with one or more hashes of the set of hashes. In some embodiments, the hashes may be organized in ranges or buckets, and the embedding system 102 may determine which bucket the first hash falls into. An embedding associated with the bucket may be assigned to the first category, for example, based on the first hash falling within the range of the bucket. Additionally or alternatively, the embedding system 102 may determine a distance between the first hash and a hash of the set of hashes. Based on the distance being less than a threshold distance, the embedding system 102 may assign an embedding corresponding to the hash to the first category. The embedding system 102 may compare the first hash with one or more hashes of the set of hashes. The comparison may be made using a similarity metric. For example, the embedding system 102 may use a distance metric (e.g., cosine distance, Euclidean distance, Manhattan distance, or a variety of other distance metrics) to determine a similarity score for two hashes. If the similarity score satisfies a threshold (e.g., is less than a threshold distance, is greater than a threshold score, etc.), the embedding system 102 may determine that the two hashes or their corresponding categories match. The embedding system 102 may use the existing embedding instead of generating a new embedding for the first hash.

In some embodiments, the embedding system 102 may use a machine learning model to determine mappings between embeddings and categories. The machine learning model may be used to verify the assignment of an embedding to a category. Alternatively, the machine learning model may be used in lieu of the set of hashes. The machine learning model may take as input a category and may output a classification that indicates an embedding of the set of embeddings. In one example, the embedding system 102 may train a machine learning model to determine mappings between categories and the set of embeddings, where inputting category data into the second machine learning model causes output of a classification indicating which embeddings of the set of embeddings should be used for corresponding categories.

The embedding system 102 may generate output associated with the first category. For example, the embedding system 102 may generate, via a machine learning model, based on the embedding assigned to the first category, output associated with the first category. In one example, the first category may be a banking product, and the embedding system 102 may recommend the banking product to a user based on output generated by the machine learning model. In one example, the first category may be a merchant and the embedding system 102 may generate an indication that a transaction associated with the merchant should be evaluated for fraud, anti-money laundering, or sanctions violations.

In some embodiments, the embedding system 102 may use a machine learning model to generate an embedding for the first category (e.g., a new category) and determine whether any existing embeddings in the set of embeddings are similar to the generated embedding. The embedding system 102 may determine that an existing embedding is similar to the generated embedding, for example, based on a distance between the two embeddings being less than a threshold distance. By doing so, the embedding system 102 may determine whether an existing embedding is an adequate fit for a new category. The comparison between the newly generated embedding and an existing embedding may allow the embedding system 102 to determine that an existing embedding may be used for the new category and may enable the embedding system 102 to use the new category without retraining other machine learning models that use embeddings. In one example, the embedding system 102 may generate, via a machine learning model, a second embedding based on the data associated with the first category. The embedding system 102 may assign the first embedding to the first category based on a distance metric associated with the first embedding and the second embedding being less than a threshold distance.

In some embodiments the embedding system 102 may monitor performance of machine learning models that use embeddings and may determine when existing embeddings should be replaced by newly generated embeddings, for example, over time as additional categories are added. For example, the embedding system 102 may determine that a machine learning model (e.g., a downstream machine learning model that uses the set of embeddings) has lower than a threshold performance level. For example, accuracy, recall, precision, or loss (e.g., cross-entropy loss or a variety of other losses) may satisfy a threshold level and may indicate that the model's performance is lower than a threshold performance level. Based on the machine learning model having lower than the threshold performance level, the embedding system 102 may generate a second embedding (e.g., a new embedding) for the first category (e.g., where the second embedding is not contained in the set of embeddings).

Figure 3:
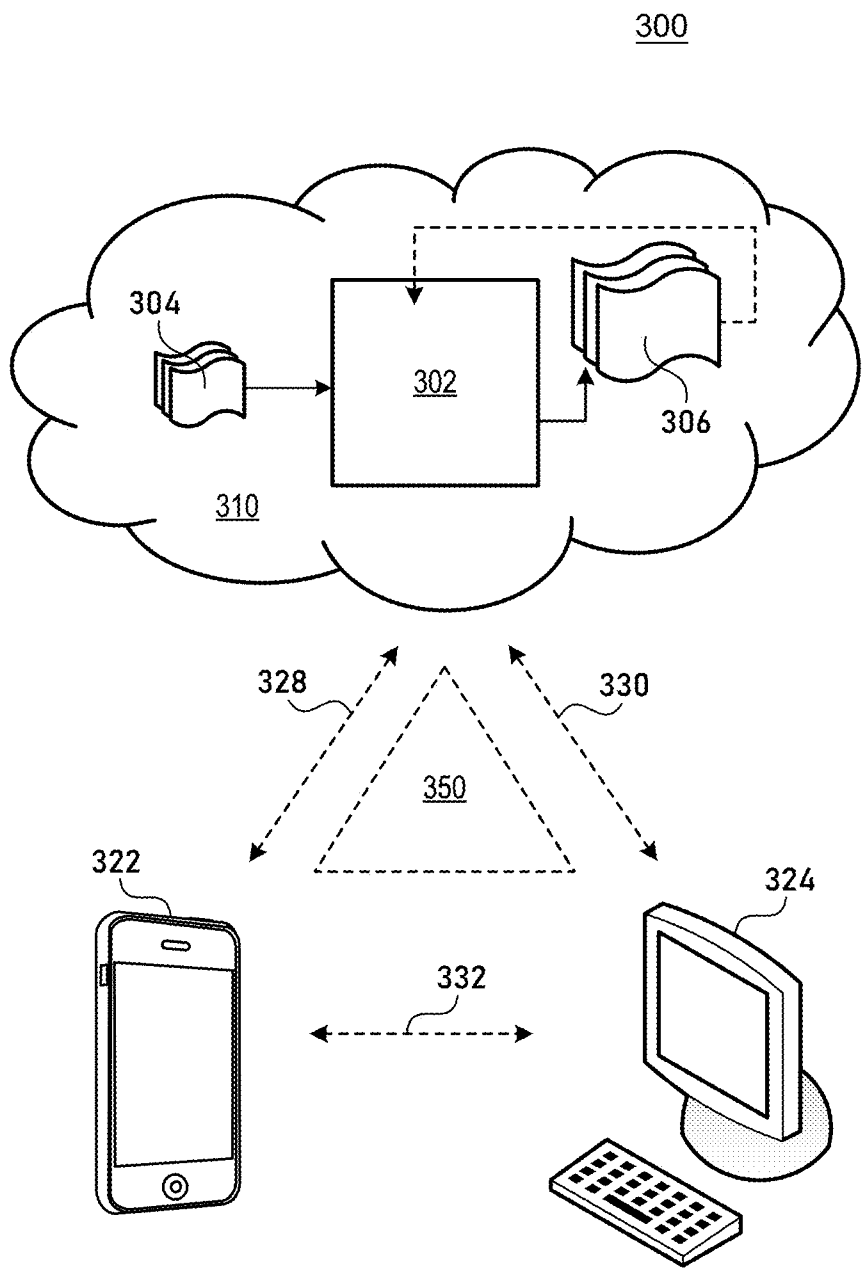
FIG. 3 shows illustrative components for a system that may be used with embeddings, in accordance with one or more embodiments.

FIG. 3 shows illustrative components for a system 300 used for training machine learning models or using machine learning models (e.g., to determine an existing embedding to use for a newly added category, or perform any other action described in connection with FIGS. 1-4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2B and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to embeddings, hashes, categories, or any other data described in connection with FIGS. 1-4).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to training machine learning models or using machine learning models (e.g., to determine an existing embedding to use for a newly added category, or perform any other action described in connection with FIGS. 1-4).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the embedding system 102 or any other device or component described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, where the first labeled feature input is labeled with a known prediction for the first labeled feature input. The system may then train the first machine learning model to classify the first labeled feature input with the known prediction (e.g., to determine an existing embedding to use for a newly added category, or perform any other action described in connection with FIGS. 1-4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to generate embeddings or perform any other action described in connection with FIGS. 1-4.

System 300 also includes application programming interface (API) layer 350. API layer 350 may allow the system to generate summaries across different devices. In some embodiments. API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
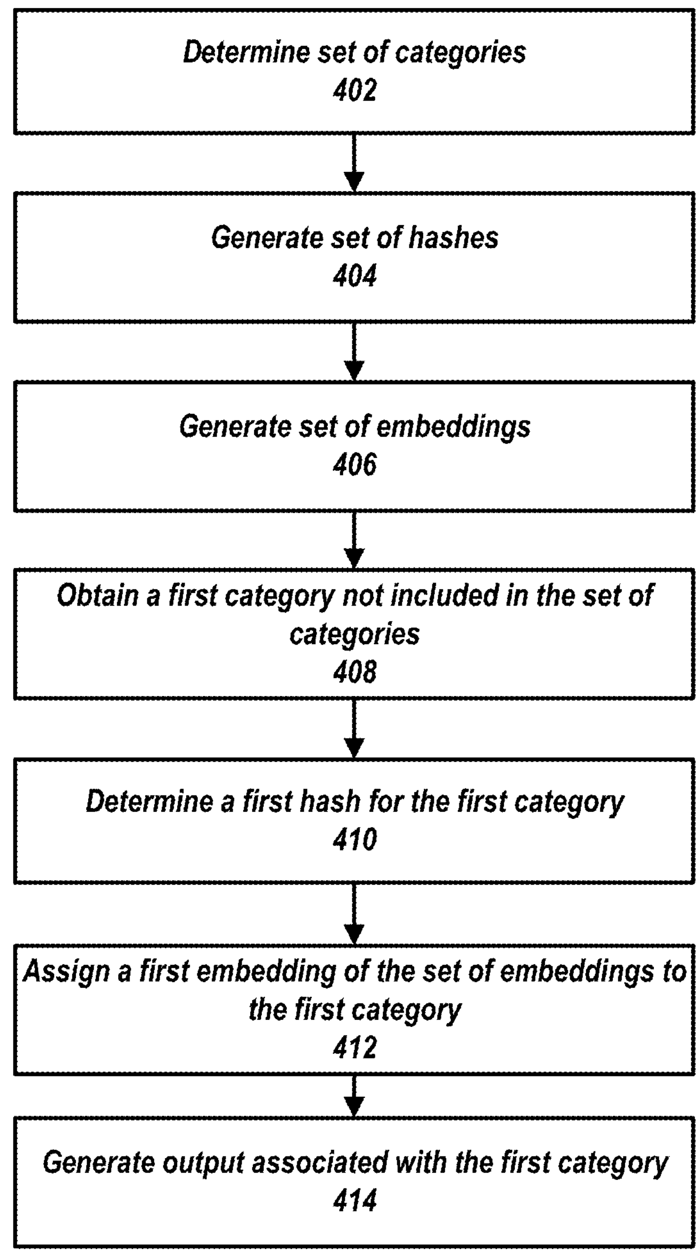
FIG. 4 shows a flowchart of the steps involved in using hashes to map categories to embeddings, in accordance with one or more embodiments.

FIG. 4 shows a flowchart of the steps involved in using hashes to map categories to embeddings, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, the computing system may determine a set of categories. The computing system may obtain a plurality of categories from a separate computing system (e.g., from the server 108) and may determine a portion of the plurality of categories to use as the set of categories. Each category in the set of categories may include a name and a textual description. A category in the set of categories may be any category described above in connection with FIG. 1 or a variety of other categories.

At step 404, the computing system may generate a set of hashes. Each hash in the set of hashes may correspond to a category of the set of categories. Each hash in the set of hashes may correspond to an embedding (e.g., as described in more detail below). The computing system may generate each hash in the set of hashes such that two similar categories have similar hashes. For example, two categories may be similar if they have hashes that are less than a threshold distance apart (e.g., as measured by a distance metric such as cosine distance, Euclidean distance, etc.). The hashes may enable the computing system to determine which existing category a new category is most similar to. For example, if a new category is obtained, the computing system may generate a new hash for the new category and compare the new hash with the previously-generated hashes. The computing system may determine to use an embedding corresponding to the category that has a hash that is most similar to the new hash. For example, instead of generating a new embedding for the new category, the computing system may use the embedding of the category that corresponds to the hash that was most similar to the new hash.

In some embodiments, the computing system may generate a plurality of vectors based on data associated with the categories. The vectors may be used to generate the set of hashes. To generate a hash for a given category, the computing system may generate a one-hot vector for each piece of data associated with the category. For example, one vector may be generated for a name of the category, another vector may be generated for the description of the category, and another vector may be generated for a category code associated with the category. Each of these vectors may be concatenated and input into a hashing function (e.g., locality sensitive hashing or a variety of other hashing functions) to generate the hash for the category. In one example, the computing system may generate a first portion of a vector, where the first portion is associated with a tokenized name of the category. The computing system may generate a second portion of the vector, where the second portion is associated with a tokenized description of the category. The computing system may generate a concatenation by concatenating the first portion and the second portion. Based on the concatenation, the computing system may generate a first hash of the set of hashes.

In some embodiments, the computing system may generate hashes such that the set of hashes is smaller than the set of categories. The computing system may determine that embeddings should be generated for only a percentage (e.g., a threshold percentage) of the set of categories. For example, the computing system may determine that only 80% of the categories should have embeddings. The computing system may generate hashes such that some of the categories are mapped into the same hash bucket (e.g., 20% of the categories are mapped into the same hash bucket as other categories). By doing so, the computing system may enable other machine learning models to train and generate classifications or predictions more efficiently because there are fewer embeddings or categories to use. In one example, the computing system may determine a threshold percentage of the set of categories and generate the set of hashes such that a size of the set of embeddings satisfies the threshold percentage (e.g., the number of embeddings in the embedding set is less than the threshold percentage, the number of embeddings is equal to the threshold percentage, etc.).

At step 406, the computing system may generate a set of embeddings. Each embedding in the set of embeddings may correspond to a category in the set of categories. Each embedding in the set of embeddings may correspond to a hash in the set of hashes. One or more embeddings in the set of embeddings may be used by a machine learning model (e.g., a model described in connection with FIG. 1 or FIG. 3) to generate one or more predictions or other inputs. As an example, the set of embeddings may be used by a machine learning model to generate recommendations associated with the set of categories.

At step 408, the computing system may obtain a first category not included in the set of categories. The first category may be a new category that was not included in the set of categories. In one example, the computing system may obtain an indication that a new product is available and should be included in recommendations to users. To generate recommendations for the new product, the computing system may need an embedding for the new product and may use an existing embedding instead of generating a new embedding, for example, as described in more detail below.

At step 410, the computing system may determine or generate a first hash for the first category obtained in step 408. The computing system may use data associated with the first category to determine the first hash. The computing system may generate the first hash using the same technique that was used to generate each hash in the set of hashes (e.g., as described above in connection with step 404).

In some embodiments, the first hash may be generated such that it corresponds to a hash bucket associated with the set of hashes. For example, the computing system may generate a vector representation of the data associated with the first category and generate the first hash based on the vector representation such that the first hash corresponds to a bucket associated with a hash of the set of hashes. The vector representation may include a first portion corresponding to the name of the first category and a second portion corresponding to a code associated with the first category.

At step 412, the computing system may assign a first embedding of the set of embeddings to the first category. The computing system may determine which embedding of the set of embeddings to assign to the category, for example, based on comparing the first hash with one or more hashes of the set of hashes. In some embodiments, the computing system may determine a distance between the first hash and a hash of the set of hashes. Based on the distance being less than a threshold distance, the computing system may assign an embedding corresponding to the hash to the first category. The computing system may use the existing embedding instead of generating a new embedding for the first hash.

In some embodiments, the computing system may use a machine learning model to determine mappings between embeddings and categories. The machine learning model may be used to verify the assignment of an embedding to a category. Alternatively, the machine learning model may be used in lieu of the set of hashes described in step 404. The machine learning model may take as input a category and may output a classification that indicates an embedding of the set of embeddings. In one example, the computing system may train a machine learning model to determine mappings between categories and the set of embeddings, where inputting category data into the second machine learning model causes output of a classification indicating which embeddings of the set of embeddings should be used for corresponding categories.

At step 414, the computing system may generate output associated with the first category. For example, the computing system may generate, via a machine learning model, based on the embedding assigned to the first category, output associated with the first category. In one example, the first category may be a banking product, and the computing system may recommend the banking product to a user based on output generated by the machine learning model. In one example, the first category may be a merchant, and the computing system may generate an indication that a transaction associated with the merchant should be evaluated for fraud, anti-money laundering, or sanctions violations.

In some embodiments, the computing system may use a machine learning model to generate an embedding for the first category (e.g., a new category) and determine whether any existing embeddings in the set of embeddings are similar to the generated embedding. The computing system may determine that an existing embedding is similar to the generated embedding, for example, based on a distance between the two embeddings being less than a threshold distance. By doing so, the computing system may determine whether an existing embedding is an adequate fit for a new category. The comparison between the newly generated embedding and an existing embedding may allow the computing system to determine that an existing embedding may be used for the new category and may enable the computing system to use the new category without retraining other machine learning models that use embeddings. In one example, the computing system may generate, via a machine learning model, a second embedding based on the data associated with the first category. The computing system may assign the first embedding to the first category based on a distance metric associated with the first embedding and the second embedding being less than a threshold distance.

In some embodiments, the computing system may monitor performance of machine learning models that use embeddings and may determine when existing embeddings should be replaced by newly generated embeddings, for example, over time as additional categories are added. For example, the computing system may determine that a machine learning model (e.g., a downstream machine learning model that uses the set of embeddings) has lower than a threshold performance level. For example, accuracy, recall, precision, or loss (e.g., cross-entropy loss or a variety of other losses) may satisfy a threshold level and may indicate that the model's performance is lower than a threshold performance level. Based on the machine learning model having lower than the threshold performance level, the computing system may generate a second embedding (e.g., a new embedding) for the first category (e.g., where the second embedding is not contained in the set of embeddings).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: determining a set of categories (e.g., where each category in the set of categories comprises a name, a textual description, or other value); generating a set of embeddings (e.g., where each embedding in the set of embeddings corresponds to a category of the set of categories); generating a set of hashes based on data associated with the set of categories, wherein each hash of the set of hashes corresponds to a category in the set of categories; determining a first hash based on data associated with a first category not included in the set of categories; based on a comparison of the first hash with the set of hashes, determining a first embedding of the set of embeddings and assigning the first embedding to the first category; and generating, via a machine learning model, based on the first embedding, output associated with the first category.

2. The method of any of the preceding embodiments, further comprising: training a second machine learning model to determine mappings between categories and the set of embeddings, wherein inputting category data into the second machine learning model causes output of a classification indicating which embeddings of the set of embeddings are to be used for corresponding categories.

3. The method of any of the preceding embodiments, further comprising: determining, via the second machine learning model, a second embedding of the set of embeddings based on the data associated with the first category; and assigning the first embedding to the first category based on a distance metric associated with the first embedding and the second embedding (e.g., the distance metric satisfying a threshold distance).

4. The method of any of the preceding embodiments, further comprising: determining a threshold percentage of the set of categories, wherein generating the set of hashes comprises generating the set of hashes such that a size of the set of embeddings satisfies the threshold percentage.

5. The method of any of the preceding embodiments, wherein generating the first hash comprises: generating a vector representation of the data associated with the first category; and generating the first hash based on the vector representation such that the first hash corresponds to a bucket associated with a hash of the set of hashes.

6. The method of any of the preceding embodiments, wherein the vector representation comprises a first portion corresponding to the name of the category and a second portion corresponding to a code associated with the category.

7. The method of any of the preceding embodiments, wherein generating the set of hashes comprises: generating a first portion of a vector, the first portion associated with a tokenized name of the category; generating a second portion of the vector, the second portion associated with a tokenized description of the category; generating a concatenation by concatenating the first portion and the second portion; and generating, based on the concatenation, a first hash of the set of hashes.

8. The method of any of the preceding embodiments, further comprising: determining that a second machine learning model has lower than a threshold performance level; and generating a second embedding for the first category based on the second machine learning model having lower than the threshold performance level, wherein the second embedding is not contained in the set of embeddings.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

What is claimed is:

1. A system for reducing computing resources for training machine learning models by generating a category embedding set comprising categories to which new categories are mapped, the system comprising:

one or more processors programmed with instructions that, when executed by the one or more processors, cause operations comprising:

storing a set of embeddings and a set of hashes mapped to a dimensional space configured to have a potential number of hashes that is less than a number of vocabulary words available in a vocabulary collection, wherein each embedding in the set of embeddings corresponds to a vocabulary word of a set of vocabulary words of the vocabulary collection, and each hash of the set of hashes corresponds to a vocabulary word in the set of vocabulary words;

based on a hash for an other vocabulary word being a first hash corresponding to a first vocabulary word that is different from the other vocabulary word and is in the set of vocabulary words, updating a mapping of a first embedding, corresponding to the first vocabulary word, to also correspond to the other vocabulary word, despite the other vocabulary word being different from the first vocabulary word, wherein the other vocabulary word is not in and not added to the set of vocabulary words; and in connection with the updating of the mapping of the first embedding to also correspond to the other vocabulary word, processing an input comprising the other vocabulary word by using the first embedding, in lieu of an embedding of the input comprising the other vocabulary word, with a machine learning model to generate output related to the input.

2. The system of claim 1, wherein processing the input comprising the other vocabulary word comprises:

generating the embedding of the input comprising the other vocabulary word; and returning the first embedding for use with the machine learning model, in lieu of the embedding of the input, based on a hash for the input comprising the other vocabulary word being the first hash corresponding to the first vocabulary word different from the other vocabulary word.

3. The system of claim 2, wherein the embedding of the input comprises a first portion corresponding to a name of the vocabulary word and a second portion corresponding to other data associated with the vocabulary word.

4. The system of claim 1, wherein a total number of hashes of the set of hashes does not exceed a threshold percentage, less than 100%, of a total number of vocabulary words in the set of vocabulary words.

5. A method comprising:

storing a set of embeddings and a set of hashes mapped to a dimensional space configured to have a potential number of hashes that is less than a number of categories available in a category collection, wherein each embedding in the set of embeddings corresponds to a category of a set of categories of the category collection, and each hash of the set of hashes corresponds to a category in the set of categories;

based on a hash for an other category not in the set of categories being a first hash corresponding to a first category that is different from the other category and in the set of categories, updating a mapping of a first embedding, corresponding to the first category, to also correspond to the other category; and processing an input comprising the other category by using the first embedding, in lieu of an embedding the input comprising the other category, with a machine learning model to generate output related to the input.

6. The method of claim 5, further comprising:

training a second machine learning model to determine mappings between categories and the set of embeddings, wherein inputting category data into the second machine learning model causes output of a classification indicating which embeddings of the set of embeddings are to be used for corresponding categories.

7. The method of claim 5, further comprising:

generating, via a second machine learning model, a second embedding for the first category that is different from the first embedding;

determining that a distance metric associated with the first embedding and the second embedding does not satisfy a threshold distance; and before the updating of the mapping of the first embedding to also correspond to the other vocabulary word, updating the mapping of the first embedding to correspond to the first category based on the determination that the distance metric associated with the first embedding and the second embedding does not satisfy the threshold distance.

8. The method of claim 5, wherein a total number of hashes of the set of hashes does not exceed a threshold percentage, less than 100%, of a total number of categories in the set of categories.

9. The method of claim 5, wherein processing the input comprises:

generating the embedding of the input comprising the other category; and returning the first embedding for use with the machine learning model, in lieu of the embedding of the input, based on a hash for the input comprising the other category being the first hash corresponding to the first category different from the other category.

10. The method of claim 9, wherein the embedding of the input comprising the other category comprises a first portion corresponding to a name of the other category and a second portion corresponding to a code associated with the other category.

11. The method of claim 5, wherein the hash for the input comprises a first portion associated with a tokenized name of the other category and a second portion associated with a tokenized description of the other category.

12. The method of claim 5, wherein processing the input comprises processing the input comprising an other product name and description by using the first embedding corresponding to a first product name and description, in lieu of the embedding of the input, with the machine learning model to generate output related to the input, the first product name and description being different from the other product name and description.

13. One or more non-transitory, computer-readable media comprising instructions that when executed by one or more processors, cause operations comprising:

storing a set of embeddings and a set of hashes, wherein each embedding in the set of embeddings corresponds to a category of an set of categories, and each hash of the set of hashes corresponds to a category in the set of categories;

based on a hash for an other category being a first hash corresponding to a first category that is different from the other category and in the set of categories, updating a mapping of a first embedding, corresponding to the first category, to also correspond to the other category, wherein the other category is not in the set of categories; and in connection with the updating of the mapping of the first embedding to also correspond to the other category, processing an input comprising the other category by using the first embedding, in lieu of an embedding of the input comprising the other category, with a machine learning model to generate output related to the input.

14. The media of claim 13, wherein the set of hashes are mapped to a dimensional space configured to have a potential number of hashes that is less than a number of categories available in a category collection.

15. The media of claim 13, the operations further comprising:

generating, via a second machine learning model, a second embedding for the first category that is different from the first embedding; and before the updating of the mapping of the first embedding to also correspond to the other category, updating the mapping of the first embedding to correspond to the first category based on a distance metric associated with the first embedding and the second embedding being less than a threshold distance.

16. The media of claim 13, wherein a total number of hashes of the set of hashes does not exceed a threshold percentage, less than 100%, of a total number of categories in the set of categories.

17. The media of claim 13, wherein processing the input comprises:

generating the embedding of the input comprising the other category; and returning the first embedding for use with the machine learning model, in lieu of the embedding of the input, based on a hash for the input comprising the other category being the first hash corresponding to the first category different from the other category.

18. The media of claim 17, wherein the embedding of the input comprising the other category comprises a first portion corresponding to a name of the other category and a second portion corresponding to a code associated with the other category.

19. The media of claim 13, wherein the hash for the input comprises a first portion associated with a tokenized name of the other category and a second portion associated with a tokenized description of the other category.

20. The media of claim 13, wherein processing the input comprises processing the input comprising an other product name and description by using the first embedding corresponding to a first product name and description, in lieu of the embedding of the input, with the machine learning model to generate output related to the input, the first product name and description being different from the other product name and description.

* * * * *